US012786524B2

(12) United States Patent
Gong et al.

(10) Patent No.: US 12,786,524 B2
(45) Date of Patent: Nov. 3, 2026

(54) VIDEO GENERATION METHOD, APPARATUS, DEVICE AND STORAGE MEDIUM

(71) Applicant: Lemon Inc., Grand Cayman (KY)

(72) Inventors: Weibo Gong, Beijing (CN); Xiaojie Jin, Los Angeles, CA (US); Ding Liu, Los Angeles, CA (US); Xiaohui Shen, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 207 days.

(21) Appl. No.: 18/711,530

(22) PCT Filed: Nov. 18, 2022

(86) PCT No.: PCT/SG2022/050839
§ 371 (c)(1),
(2) Date: Dec. 2, 2024

(87) PCT Pub. No.: WO2023/091090
PCT Pub. Date: May 25, 2023

(65) Prior Publication Data

US 2025/0097545 A1 Mar. 20, 2025

(30) Foreign Application Priority Data

Nov. 18, 2021 (CN) ......................... 202111373450.1

(51) Int. Cl.
*H04N 21/81* (2011.01)
*G06V 10/42* (2022.01)
*G06V 10/44* (2022.01)

(52) U.S. Cl.
CPC ........... *H04N 21/816* (2013.01); *G06V 10/42* (2022.01); *G06V 10/44* (2022.01); *H04N 21/8113* (2013.01)

(58) Field of Classification Search
CPC .. H04N 21/816; H04N 21/8113; G06V 10/42; G06V 10/44
See application file for complete search history.

(56) References Cited

U.S. PATENT DOCUMENTS

2009/0307207 A1* 12/2009 Murray ................. G06F 16/433 707/999.005
2020/0351450 A1* 11/2020 Kim ....................... G06V 20/41
(Continued)

FOREIGN PATENT DOCUMENTS

CN 109615682 A 4/2019
CN 110278388 A 9/2019
(Continued)

OTHER PUBLICATIONS

International Patent Application No. PCT/SG2022/050839; Int'l Written Opinion and Search Report; dated Jun. 23, 2023; 7 pages.
(Continued)

*Primary Examiner* — Girumsew Wendmagegn
(74) *Attorney, Agent, or Firm* — BakerHostetler

(57) ABSTRACT

The embodiments of the present disclosure provide a video generation method, an apparatus, a device, and a storage medium, the video generation method including: obtaining a plurality of images and music matched to the plurality of images; determining first feature information for the plurality of images and second feature information for the music; according to the first feature information, the second feature information and a plurality of pre-stored rendering effects, determining a target rendering effect combination; the rendering effects being animation, special effects or a transition; and generating a video according to the plurality of images, the music and the target rendering effect combination.

20 Claims, 4 Drawing Sheets

(56) References Cited

U.S. PATENT DOCUMENTS

| | | | | |
|---|---|---|---|---|
| 2022/0319493 | A1* | 10/2022 | Ohishi | G10L 15/22 |
| 2024/0296870 | A1* | 9/2024 | Zheng | G06F 3/04842 |

FOREIGN PATENT DOCUMENTS

| | | | |
|---|---|---|---|
| CN | 110688496 | A | 1/2020 |
| CN | 112035685 | A | 12/2020 |
| CN | 112800263 | A | 5/2021 |
| CN | 113569088 | A | 10/2021 |
| JP | 2005-025715 | A | 1/2005 |

OTHER PUBLICATIONS

China Patent Application No. 202111373450.1; Office Action; dated Mar. 9, 2026; 26 pages.

* cited by examiner

VIDEO GENERATION METHOD, APPARATUS, DEVICE AND STORAGE MEDIUM

CROSS-REFERENCE TO RELATED APPLICATIONS

The present disclosure is a U.S. National Stage Application under 35 U.S.C. § 371 of International Patent Application No. PCT/SG2022/050839, filed on Nov. 18, 2022, which is based on and claims the benefit of priority to the Chinese patent application No. 202111373450.1 with a title "VIDEO GENERATION METHOD, APPARATUS, DEVICE, AND STORAGE MEDIUM", filed on Nov. 18, 2021, which are hereby incorporated by reference in their entireties into the present disclosure.

TECHNICAL FIELD

The present disclosure relates to the technical field of video generation, and in particular, to a video generation method, apparatus, device, and storage medium.

BACKGROUND

Currently, an electronic device may generate a video from a set of images selected by a user.

In the related art, an electronic device acquires a set of images selected by a user and music matched with the set of images, and generates a video from the set of images and the music.

In the above-described related art, the video is generated from the set of images and the music, so that the video is poor in richness.

SUMMARY

Embodiments of the present disclosure provide a video generation method, apparatus, device, and storage medium, for solving the problem of poor richness of the generated video.

In a first aspect, an embodiment of the present disclosure provides a video generation method, comprising: acquiring a plurality of images and music matched with the plurality of images; determining first feature information of the plurality of images and second feature information of the music; determining a target rendering effect combination according to the first feature information, the second feature information and a pre-stored plurality of rendering effects; wherein the rendering effects are animation, special effect or transition; and generating a video according to the plurality of images, the music and the target rendering effect combination.

Alternatively, the first feature information comprises a first global feature and a first local feature; the second feature information comprises a second global feature and a second local feature; the determining a target rendering effect combination according to the first feature information, the second feature information and a pre-stored plurality of rendering effects, comprises: determining a plurality of candidate effects in the plurality of rendering effects according to the first global feature and the second global feature; determining one or more target effects in the plurality of candidate effects according to the first local feature, and performing combination processing on the one or more target effects to obtain one or more rendering combinations; and determining the target rendering effect combination according to the first local feature, the second local feature and the one or more rendering combinations.

Alternatively, the first global feature comprises a first image emotion, a first image style and a first image scene corresponding to the plurality of images; the second global feature comprises a first music emotion, a first music style and a first music theme; and the determining a plurality of candidate effects in the plurality of rendering effects according to the first global feature and the second global feature, comprises: for each rendering effect, acquiring a first initial score corresponding to each of the first image emotion, the first image style and the first image scene according to an identification of the each rendering effect; screening the plurality of rendering effects according to the first initial score to obtain a plurality of intermediate effects; for each intermediate effect, acquiring a second initial score corresponding to each of the first music emotion, the first music style and the first music theme according to an identification of the each intermediate effect; and screening the plurality of intermediate effects according to the second initial score to obtain the plurality of candidate effects.

Alternatively, the screening the plurality of rendering effects according to the first initial score to obtain a plurality of intermediate effects, comprises: for each rendering effect, determining a sum of the first initial score corresponding to each of the first image emotion, the first image style and the first image scene, as a first target score corresponding to the each rendering effect; and determining rendering effects of which the first target score is greater than or equal to a first threshold in the plurality of rendering effects, as the plurality of intermediate effects.

Alternatively, the screening the plurality of intermediate effects according to the second initial score to obtain the plurality of candidate effects, comprises: for each intermediate effect, determining a sum of the second initial score corresponding to each of the first music emotion, the first music style and the first music theme, as a second target score corresponding to the each intermediate effect; and determining intermediate effects of which the second target score is greater than or equal to a second threshold in the plurality of intermediate effects, as the plurality of candidate effects.

Alternatively, the first local feature comprises a second image emotion, a second image style and a second image scene corresponding to each of the plurality of images; the determining one or more target effects in the plurality of candidate effects according to the first local feature, comprises: for each image, determining a third target score corresponding to each of the plurality of candidate effects under a condition of the image, according to the plurality of candidate effects and the second image emotion, the second image style and the second image scene corresponding to the each image; and determining the one or more target effects in the plurality of candidate effects according to the third target score corresponding to each of the plurality of candidate effects.

Alternatively, the first local feature comprises a second image emotion, a second image style and a second image scene corresponding to each of the plurality of images; the second local feature comprises a chorus point, a phrase and section point and a beat point of a music fragment corresponding to each of the plurality of images in the music; the determining the target rendering effect combination according to the first local feature, the second local feature and the one or more rendering combinations, comprises: screening the one or more rendering combinations according to a second image emotion, a second image style and a second image scene corresponding to a first image in the plurality of images, and a chorus point, a phrase and section point and a beat point of a music fragment corresponding to the first image, to obtain N initial candidate combinations, where N is an integer greater than or equal to 1; determining M (j−1)th candidate combinations according to the N initial candidate combinations and the one or more rendering combinations, where M is equal to a product of N and a total number of the one or more rendering combinations; screening the M (j−1)th candidate combinations according to a second image emotion, a second image style and a second image scene corresponding to a jth image, and a chorus point, a phrase and section point and a beat point of a music fragment corresponding to the jth image, to determine N jth candidate combinations, and taking the N jth candidate combinations as new N initial candidate combinations, adding 1 to j, and repeating the steps until a last image in the plurality of images, and determining a candidate combination corresponding to the last image as the target rendering effect combination; where an initial value of j is 2.

Alternatively, the screening the one or more rendering combinations according to a second image emotion, a second image style and a second image scene corresponding to a first image, and a chorus point, a phrase and section point and a beat point of a music fragment corresponding to the first image, to obtain N initial candidate combinations, comprises: determining a combination score corresponding to each of the one or more rendering combinations according to the second image emotion, the second image style and the second image scene corresponding to the first image, and the chorus point, the phrase and section point and the beat point of the music fragment corresponding to the first image; and determining N rendering combinations of which the combination score is greater than or equal to a fourth threshold in the one or more rendering combinations, as the N initial candidate combinations.

Alternatively, the determining a combination score corresponding to each of the one or more rendering combinations according to the second image emotion, the second image style and the second image scene corresponding to the first image, and the chorus point, the phrase and section point and the beat point of the music fragment corresponding to the first image, comprises: for each rendering combination in the one or more rendering combinations, determining a music matching score according to the chorus point, the phrase and section point and the beat point of the music fragment corresponding to the first image and an identification of each rendering effect in the rendering combination; determining an image matching score according to the second image emotion, the second image style and the second image scene corresponding to the first image and the identification of each rendering effect in the rendering combination; determining an internal combination score corresponding to the first image; and determining the music matching score, the image matching score and the internal combination score as the combination score corresponding to the each rendering combination.

Alternatively, the determining first feature information of the plurality of images and second feature information of the music, comprises: performing feature extraction on the plurality of images through a pre-stored image feature extraction model, to obtain the first feature information of the plurality of images; and performing feature extraction on the music through a pre-stored music feature extraction model, to obtain the second feature information.

Alternatively, the target rendering effect combination comprises the animation, special effect and transition corresponding to each of the plurality of images; the generating a video according to the plurality of images, the music and the target rendering effect combination, comprises: sequentially displaying the plurality of images according to the animation, special effect and transition corresponding to each the plurality of images in the target rendering effect combination, and playing the music, to generate the video.

Alternatively, the acquiring a plurality of images and music matched with the plurality of images, comprises: in response to a selection operation on a plurality of target images in a plurality of candidate images, determining the plurality of target images as the plurality of images; and in response to a selection operation on target music in a plurality of candidate music, determining the target music as the music matched with the plurality of images.

In a second aspect, an embodiment of the present disclosure provides a video generation apparatus, comprising: an acquisition module configured to acquire a plurality of images and music matched with the plurality of images; a first determination module configured to determine first feature information of the plurality of images and second feature information of the music; a second determination module configured to determine a target rendering effect combination according to the first feature information, the second feature information and a pre-stored plurality of rendering effects; the rendering effects being animation, special effect or transition; and a generation module configured to generate a video according to the plurality of images, the music and the target rendering effect combination.

Alternatively, the first feature information comprises a first global feature and a first local feature; the second feature information comprises a second global feature and a second local feature; the second determination module is specifically configured to: determine a plurality of candidate effects in the plurality of rendering effects according to the first global feature and the second global feature; determine one or more target effects in the plurality of candidate effects according to the first local feature, and perform combination processing on the one or more target effects to obtain one or more rendering combinations; and determine the target rendering effect combination according to the first local feature, the second local feature and the one or more rendering combinations.

Alternatively, the first global feature comprises a first image emotion, a first image style and a first image scene corresponding to the plurality of images, and the second global feature comprises a first music emotion, a first music style and a first music theme; the second determination module is specifically configured to: for each rendering effect, acquire a first initial score corresponding to each of the first image emotion, the first image style and the first image scene according to an identification of the rendering effect; screen the plurality of rendering effects according to the first initial score to obtain a plurality of intermediate effects; for each intermediate effect, acquire a second initial score corresponding to each of the first music emotion, the first music style and the first music theme according to an identification of the intermediate effect; and screen the plurality of intermediate effects according to the second initial score to obtain the plurality of candidate effects.

Alternatively, the second determination module is specifically configured to: for each rendering effect, determine a sum of the first initial score corresponding to each of the first image emotion, the first image style and the first image scene, as a first target score corresponding to the rendering effect; and determine rendering effects of which the first target score is greater than or equal to a first threshold in the plurality of rendering effects, as the plurality of intermediate effects.

Alternatively, the second determination module is specifically configured to: for each intermediate effect, determine a sum of the second initial score corresponding to each of the first music emotion, the first music style and the first music theme, as a second target score corresponding to the intermediate effect; and determine intermediate effects of which the second target score is greater than or equal to a second threshold in the plurality of intermediate effects, as the plurality of candidate effects.

Alternatively, the first local feature comprises a second image emotion, a second image style and a second image scene corresponding to each of the plurality of images; the second determination module is specifically configured to: for each image, determine a third target score corresponding to each of the plurality of candidate effects under a condition of the each image, according to the plurality of candidate effects and the second image emotion, the second image style and the second image scene corresponding to the each image; and determine the one or more target effects in the plurality of candidate effects according to the third target score corresponding to each of the plurality of candidate effects.

Alternatively, the first local feature comprises a second image emotion, a second image style and a second image scene corresponding to each of the plurality of images; the second local feature comprises a chorus point, a phrase and section point and a beat point of a music fragment corresponding to each of the plurality of images in the music; the second determination module is specifically configured to: screen the one or more rendering combinations according to a second image emotion, a second image style and a second image scene corresponding to a first image in the plurality of images, and a chorus point, a phrase and section point and a beat point of a music fragment corresponding to the first image, to obtain N initial candidate combinations, where N is an integer greater than or equal to 1; determine M (j−1)th candidate combinations according to the N initial candidate combinations and the one or more rendering combinations, where M is equal to a product of N and a total number of the one or more rendering combinations; screen the M (j−1)th candidate combinations according to a second image emotion, a second image style and a second image scene corresponding to a jth image, and a chorus point, a phrase and section point and a beat point of a music fragment corresponding to the jth image, to determine N jth candidate combinations, and take the N jth candidate combinations as new N initial candidate combinations, add 1 to j, and repeat the steps until a last image in the plurality of images, and determine a candidate combination corresponding to the last image as the target rendering effect combination; where an initial value of j is 2.

Alternatively, the second determination module is specifically configured to: determine a combination score corresponding to each of the one or more rendering combinations according to the second image emotion, the second image style and the second image scene corresponding to the first image, and the chorus point, the phrase and section point and the beat point of the music fragment corresponding to the first image; and determine N rendering combinations of which the combination score is greater than or equal to a fourth threshold in the one or more rendering combinations, as the N initial candidate combinations.

Alternatively, the second determination module is specifically configured to: for each rendering combination in the one or more rendering combinations, determine a music matching score according to the chorus point, the phrase and section point and the beat point of the music fragment corresponding to the first image and an identification of each rendering effect in the rendering combination; determine an image matching score according to the second image emotion, the second image style and the second image scene corresponding to the first image and the identification of each rendering effect in the rendering combination; determine an internal combination score corresponding to the first image; and determine the music matching score, the image matching score and the internal combination score as the combination score corresponding to the each rendering combination.

Alternatively, the first determination module is specifically configured to: perform feature extraction on the plurality of images through a pre-stored image feature extraction model, to obtain the first feature information of the plurality of images; and perform feature extraction on the music through a pre-stored music feature extraction model, to obtain the second feature information.

Alternatively, the generation module is specifically configured to: sequentially display the plurality of images according to the animation, special effect and transition corresponding to each of the plurality of images in the target rendering effect combination, and play the music, to generate the video.

Alternatively, the acquisition module is specifically configured to: in response to a selection operation on a plurality of target images in a plurality of candidate images, determine the plurality of target images as the plurality of images; and in response to a selection operation on target music in a plurality of candidate music, determine the target music as the music matched with the plurality of images.

In a third aspect, an embodiment of the present disclosure provides an electronic device, comprising: a processor, and a memory communicatively connected to the processor;

the memory storing computer-executable instructions;

the processor executing the computer-executable instructions stored in the memory to implement the method according to any one of the first aspect.

In a fourth aspect, an embodiment of the present disclosure provide a computer-readable storage medium, having computer-executable instructions stored thereon, which, when executed by a processor, implement the method according to any one of the first aspect.

In a fifth aspect, an embodiment of the present disclosure provides a computer program product comprising a computer program which, when executed by a processor, implements the method according to any one of the first aspect.

In a sixth aspect, an embodiment of the present disclosure provides a computer program which, when executed by a processor, implements the method according to any one of the first aspect.

The embodiments of the present disclosure provide a video generation method, apparatus, device, and storage medium, wherein the video generation method comprises: acquiring a plurality of images and music matched with the plurality of images; determining first feature information of the plurality of images and second feature information of the music; determining a target rendering effect combination according to the first feature information, the second feature information and a pre-stored plurality of rendering effects; the rendering effects being animation, special effect or transition; and generating a video according to the plurality of images, the music and the target rendering effect combination. In the method, the richness of the video is improved by means of generating the video according to the plurality of images, the music and the target rendering effect combination.

BRIEF DESCRIPTION OF THE DRAWINGS

The accompanying drawings, which are incorporated in and constitute a part of this specification, illustrate embodiments consistent with the present disclosure and together with the description, serve to explain the principles of the present disclosure.

Figure 1:
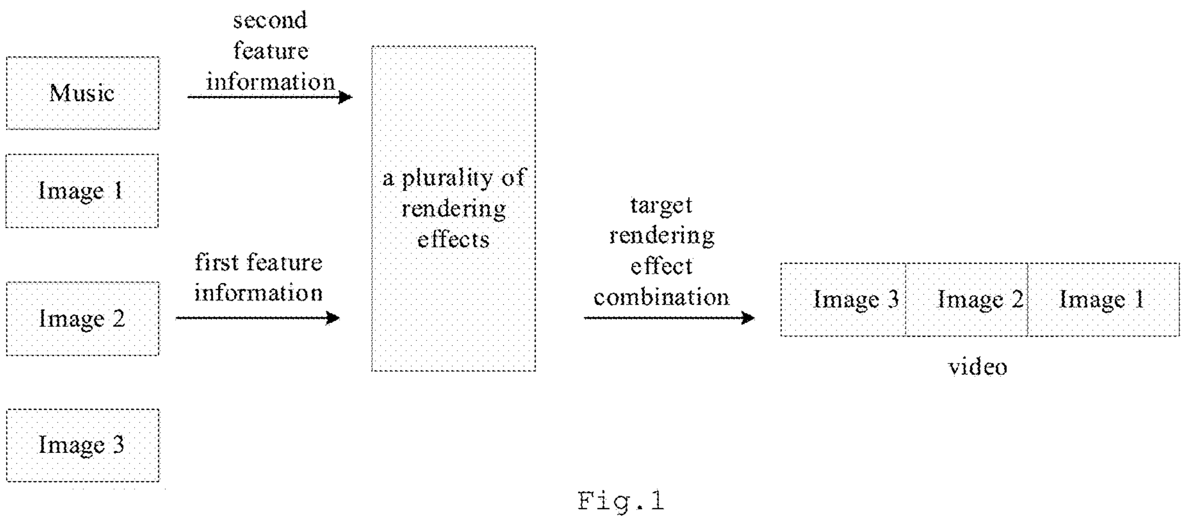
FIG. 1 is a schematic diagram of an application scenario according to embodiments of the present disclosure.

With the above drawings, explicit embodiments of the present disclosure are shown and will be described in more detail hereinafter. The drawings and the description thereof are not intended to limit the scope of the concepts of the present disclosure in any manner, but rather to illustrate the concepts of the present disclosure for those skilled in the art with reference to specific embodiments.

DETAILED DESCRIPTION

Reference will now be made in detail to the exemplary embodiments, examples of which are illustrated in the drawings. The following description refers to the drawings in which the same numbers in different drawings represent the same or similar elements unless otherwise indicated. The implementations described in the following exemplary examples do not represent all implementations consistent with the present disclosure. Rather, they are merely examples of apparatus and methods consistent with certain aspects of the present disclosure, as detailed in the appended claims.

First, the technical terms involved in the present disclosure will be explained.

Animation, refers to the effect of deformation and displacement of an image.

Transition, refers to the effect of switching between two images.

Special effect, refers to some particle special effects or light and shade color changes made on an image.

The related art is explained next.

In the related art, an electronic device recommends a special effect for the set of images according to music, and then generates a video according to the set of images, the music and the recommended special effect, so that the generated video is poor in richness.

In the present disclosure, in order to improve the richness of the video, inventors found that, by determining a target rendering effect combination corresponding to a plurality of images and music, wherein the target rendering effect combination may include one or more rendering effects of animation, transition or special effect, and generating a video according to the plurality of images, the music and the target rendering effect combination, the video can have the one or more rendering effects of animation, transition or special effect, so that the richness of the video is improved.

The application scenario involved in the present disclosure is described below with reference to FIG. 1, specifically, please see FIG. 1.

FIG. 1 is a schematic diagram of an application scenario according to embodiments of the present disclosure. As shown in FIG. 1, a plurality of images, music, a plurality of rendering effects, a target rendering effect combination, a video are included. For example, the plurality of images include image 1, image 2, and image 3.

The plurality of images are matched with the music.

The target rendering effect combination includes rendering effects. The target rendering effect combination is determined according to first feature information of the plurality of images, second feature information of the music and a plurality of rendering effects.

The video is generated according to the plurality of images, the music, and the target rendering effect combination.

In the present disclosure, the target rendering effect combination is determined according to the first feature information of the plurality of images, the second feature information of the music and the plurality of rendering effects, and then the video is generated according to the plurality of images, the music and the target rendering effect combination, so that the video contains the rendering effects in the target rendering effect combination, and the richness of the video is improved.

The following describes in detail the technical solution of the present disclosure and how the technical solution of the present disclosure solves the above technical problem by specific embodiments. The following several specific embodiments may be combined with each other, and details of the same or similar concepts or processes may not be repeated in some embodiments. The embodiments of the present disclosure will be described below with reference to the drawings.

Figure 2:
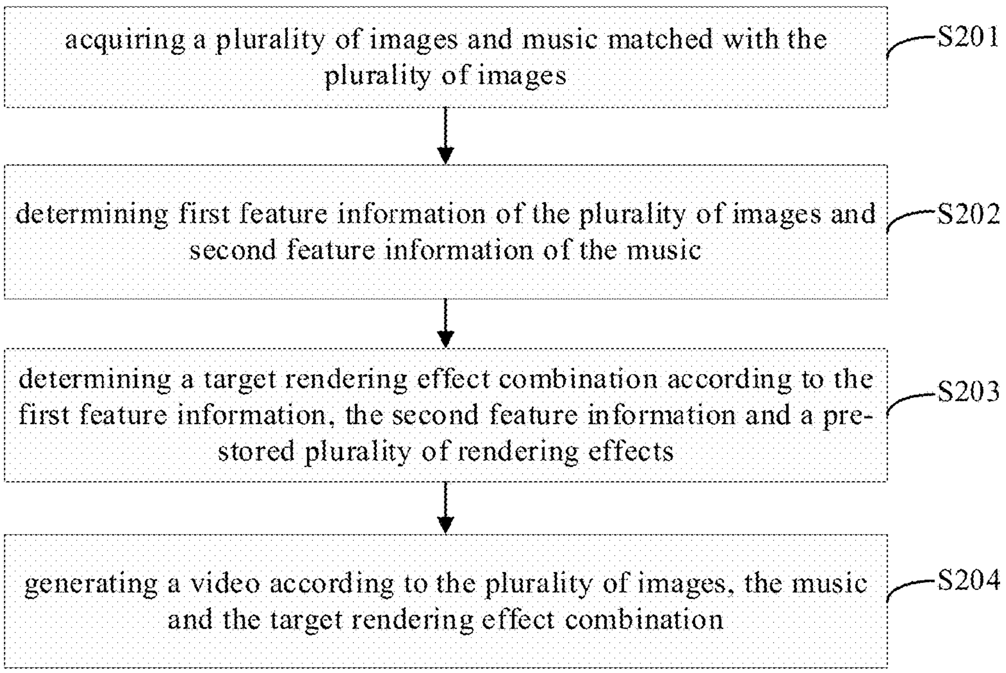
FIG. 2 is a flowchart of a video generation method according to embodiments of the present disclosure.

FIG. 2 is a flowchart of a video generation method according to embodiments of the present disclosure. As shown in FIG. 2, the method includes:

S201, acquiring a plurality of images and music matched with the plurality of images.

Alternatively, an execution subject of the embodiments of the present disclosure is an electronic device, and may also be a video generation apparatus provided in the electronic device, where the video generation apparatus may be implemented by a combination of software and/or hardware.

The electronic device may be a Personal Digital Assistant (PDA), a User Device or a User Equipment, a tablet computer, a desktop computer, a video camera, a video recorder, or the like.

Alternatively, the acquiring a plurality of images and music matched with the plurality of images may be made in 2 ways as follows.

Way 1, in response to a selection operation of a plurality of target images in a plurality of candidate images, determining the plurality of target images as the plurality of images; and in response to a selection operation of target music in a plurality of candidate music, determining the target music as the music matched with the plurality of images.

Way 2, in response to a selection operation of a plurality of target images in a plurality of candidate images, determining the plurality of target images as the plurality of images, and processing the plurality of images and a plurality of candidate music by a preset music matching model, to obtain the music matched with the plurality of images.

Alternatively, the plurality of candidate images may be images pre-stored in the electronic device, and the plurality of candidate music may be music pre-stored in the electronic device and/or a preset server.

It should be noted that, each image corresponds to part of music fragments in the music, and the music fragments corresponding to each of the plurality of images can constitute the music.

S202, determining first feature information of the plurality of images and second feature information of the music.

Alternatively, the determining first feature information of the plurality of images and second feature information of the music may be made in 2 ways as follows.

Way 1, performing feature extraction on the plurality of images and the music through a pre-trained feature extraction model, to obtain the first feature information of the plurality of images and the second feature information of the music.

Alternatively, the pre-trained feature extraction model is obtained by training with a plurality of sample data. Each sample data includes one or more sample images and sample music matched with the one or more sample images.

Way 2, performing feature extraction on the plurality of images through a pre-stored image feature extraction model, to obtain the first feature information of the plurality of images; and performing feature extraction on the music through a pre-stored music feature extraction model to obtain the second feature information.

The first feature information includes a first global feature and a first local feature.

The first global feature is a comprehensive feature of all of the plurality of images and the first local feature is a feature of each of the plurality of images.

The first global feature includes one or more of an image emotion label, an image style label or an image scene label corresponding to the plurality of images.

The image emotion label includes a first image emotion. For example, the first image emotions include image emotions Tm1, Tm2, Tm3, Tm4, and the like.

The image style label includes a first image style. For example, the first image style includes image styles Tf1, Tf3, and the like.

The image scene label includes a first image scene. For example, the first image scene includes image scenes Tt1, Tt2, Tt3, and the like.

The first local feature includes one or more of an image emotion label, an image style label and an image scene label corresponding to each of the plurality of images (i.e., The first local feature includes one or more of an image emotion label, an image style label and an image scene label corresponding to each of the plurality of images).

The image emotion label includes a second image emotion. The image style label includes a second image style. The image scene label includes a second image scene.

Alternatively, the first image emotion may be the same as or different from the second image emotion, the first image style may be the same as or different from the second image style, and the first image scene may be the same as or different from the second image scene.

The second feature information includes a second global feature and a second local feature.

The second global feature include a music emotion label, a music style label and a music theme label of the music.

The music emotion label includes a first music emotion. For example, the first music emotions include music emotions Me1, Me2, and the like.

The music style label includes a first music style. For example, the first music style includes music styles Mf1, Mf2, and the like.

The music theme label includes a first music theme. For example, the first music theme includes music themes Mt1, Mt2, Mt3, and the like.

The second local feature includes a chorus point, a phrase and section point and a beat point of a music fragment corresponding to each of the plurality of images in the music.

S203, determining a target rendering effect combination according to the first feature information, the second feature information and a pre-stored plurality of rendering effects.

The pre-stored plurality of rendering effects may be stored in a preset animation-transition-special effect database.

The rendering effect can be any one of animation, special effect or transition.

The plurality of rendering effects may include a plurality of different animations, a plurality of different special effects, and a plurality of different transitions.

Each rendering effect has a respective attribute. For example, attributes include effect direction, visual impact, and the like.

Alternatively, the target rendering effect combination may include X rendering effects corresponding to each of the plurality of images, may also include X rendering effects corresponding to each of some of the plurality of images, and may also include one or more of an identification, a name, a type, and the like corresponding to each of the X rendering effects.

Alternatively, the X rendering effects may include one or more of animation, special effect, or transition.

Figure 3:
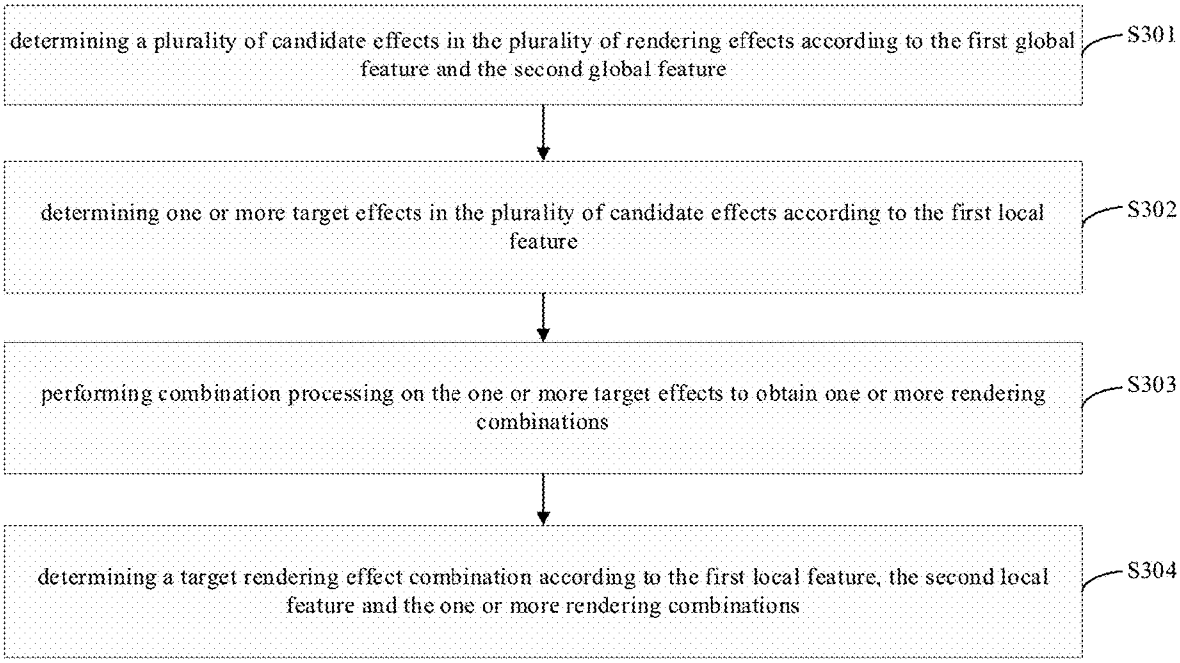
FIG. 3 is a flowchart of a method for determining a target rendering effect combination according to embodiments of the present disclosure.

Specifically, please refer to the embodiment in FIG. 3 for a detailed description of S203.

S204, generating a video according to the plurality of images, the music and the target rendering effect combination.

In response to the target rendering effect combination comprising the animation, special effect and transition corresponding to each of the plurality of images, the plurality of images are displayed sequentially according to the animation, special effect and transition corresponding to each of the plurality of images in the target rendering effect combination, and the music is played, to generate the video.

It should be noted that, in response to the target rendering effect combination comprising the animation, special effect, and transition corresponding to each of some of the plurality of images, in the process of sequentially displaying the plurality of images, each of the some of the images is displayed according to the animation, special effect, and transition corresponding to the each of the some of the images in the target rendering effect combination.

In the video generation method according to the embodiment of FIG. 2, the video is generated according to the plurality of images, the music and the target rendering effect combination, so that the rendering effects included in the target rendering effect combination can be added to the video, the video is more novel and interesting, and thus the richness of the video is improved.

In the present disclosure, after the plurality of images and the music matched with the plurality of images are acquired, the electronic device can automatically execute the video generation method according to the embodiments of the present disclosure, so that the video generation time is reduced, and the video generation efficiency is improved. The plurality of images and the music matched with the plurality of images can be selected by the user, so that the video generation method according to the embodiments of the present disclosure achieves a user operable level, and the user experience is improved.

On the basis of the embodiment of FIG. 2, the following describes in detail the execution process of S203 in conjunction with FIG. 3.

FIG. 3 is a flowchart of a method for determining a target rendering effect combination according to embodiments of the present disclosure. As shown in FIG. 3, the method includes:

S301, determining a plurality of candidate effects in the plurality of rendering effects according to the first global feature and the second global feature.

For example, in response to the first global feature comprising an image emotion label, an image style label and an image scene label, where the image emotion label includes a first image emotion, the image style label includes a first image style and the image scene label includes a first image scene, and the second global feature includes a music emotion label, a music style label and a music theme label, where the music emotion label includes a first music emotion, the music style label includes a first music style and the music theme label includes a first music theme, S301 may specifically include:

- for each rendering effect, acquiring a first initial score corresponding to each one of the first image emotion, the first image style and the first image scene according to an identification of the rendering effect; and screening the plurality of rendering effects according to the first initial score to obtain a plurality of intermediate effects;
- for each intermediate effect, acquiring a second initial score corresponding to each one of the first music emotion, the first music style and the first music theme according to an identification of the intermediate effect; and screening the plurality of intermediate effects according to the second initial score to obtain the plurality of candidate effects.

Alternatively, according to the identification of the each rendering effect, the first initial score corresponding to the first image emotion is acquired from a first preset list, the first initial score corresponding to the first image style is acquired from a second preset list, and the first initial score corresponding to the first image scene is acquired from a third preset list. The first preset list is a list corresponding to the image emotion label, the second preset list is a list corresponding to the image style label, and the third preset list is a list corresponding to the image scene label. For example, the first preset list is shown in Table 1 below, the second preset list is shown in Table 2 below, and the third preset list is shown in Table 3 below.

TABLE 1

| Identification | Name | Type | Tm1 | Tm2 | . . . |
|---|---|---|---|---|---|
| 1 | Name 1 | Animation | A11 | A12 | . . . |
| 2 | Name 2 | Animation | A21 | A22 | . . . |
| 3 | Name 3 | Transition | A31 | A32 | . . . |
| 4 | Name 4 | Transition | A41 | A42 | . . . |
| 5 | Name 5 | Special effect | A51 | A52 | . . . |
| 6 | Name 6 | Special effect | A61 | A62 | . . . |
| . . . | . . . | . . . | . . . | . . . | . . . |

TABLE 2

| Identification | Name | Type | Tf1 | Tf2 | . . . |
|---|---|---|---|---|---|
| 1 | Name 1 | Animation | B11 | B12 | . . . |
| 2 | Name 2 | Animation | B21 | B22 | . . . |
| 3 | Name 3 | Transition | B31 | B32 | . . . |
| 4 | Name 4 | Transition | B41 | B42 | . . . |
| 5 | Name 5 | Special effect | B51 | B52 | . . . |
| 6 | Name 6 | Special effect | B61 | B62 | . . . |
| . . . | . . . | . . . | . . . | . . . | . . . |

TABLE 3

| Identification | Name | Type | Tt1 | Tt2 | . . . |
|---|---|---|---|---|---|
| 1 | Name 1 | Animation | C11 | C12 | . . . |
| 2 | Name 2 | Animation | C21 | C22 | . . . |
| 3 | Name 3 | Transition | C31 | C32 | . . . |
| 4 | Name 4 | Transition | C41 | C42 | . . . |
| 5 | Name 5 | Special effect | C51 | C52 | . . . |
| 6 | Name 6 | Special effect | C61 | C62 | . . . |
| . . . | . . . | . . . | . . . | . . . | . . . |

In Tables 1-3, A11-A62, B11-B62, and C11-C62 are the first initial scores.

For example, in response to the first image emotion including Tm1 and Tm2, the first image style includes Tf1, and the first image scene includes Tt1, Tt2; for the rendering effect identified as 1, according to the identification 1, a first initial score A12 corresponding to Tm1 and a first initial score corresponding to Tm2 are acquired from the first preset list, a first initial score B11 corresponding to Tf1 is acquired from the second preset list, and a first initial score C11 corresponding to Tt1 and a first initial score C12 corresponding to Tt2 are acquired from the third preset list.

The screening the plurality of rendering effects according to the first initial score to obtain a plurality of intermediate effects, includes: for each rendering effect, determining a sum of the first initial score corresponding to the first image emotion, the first initial score corresponding to the first image style and the first initial score corresponding to the first image scene, as a first target score corresponding to the rendering effect; and determining rendering effects of which the first target score is greater than or equal to a first threshold in the plurality of rendering effects, as the plurality of intermediate effects.

For example, for the rendering effect identified as 1, a sum of A11, A12, B11, C11, and C12 is determined as the first target score corresponding to the rendering effect identified as 1.

Further, according to the identification of the intermediate effect, a second initial score corresponding to the first music emotion may be acquired from a fourth preset list, a second initial score corresponding to the first music style may be acquired from a fifth preset list, and a second initial score corresponding to the first music theme may be acquired from a sixth preset list. The fourth preset list is a list corresponding to the music emotion label, the fifth preset list is a list corresponding to the music style label, and the sixth preset list is a list corresponding to the music theme label. For example, the fourth preset list is shown in Table 4 below, the fifth preset list is shown in Table 5 below, and the sixth preset list is shown in Table 6 below.

TABLE 4

| Identification | Name | Type | Me1 | Me2 | . . . |
|---|---|---|---|---|---|
| 1 | Name 1 | Animation | D11 | D12 | . . . |
| 2 | Name 2 | Animation | D21 | D22 | . . . |
| 3 | Name 3 | Transition | D31 | D32 | . . . |
| 4 | Name 4 | Transition | D41 | D42 | . . . |
| 5 | Name 5 | Special effect | D51 | D52 | . . . |
| 6 | Name 6 | Special effect | D61 | D62 | . . . |
| . . . | . . . | . . . | . . . | . . . | . . . |

TABLE 5

| Identification | Name | Type | Mf1 | Mf2 | . . . |
|---|---|---|---|---|---|
| 1 | Name 1 | Animation | E11 | E12 | . . . |
| 2 | Name 2 | Animation | E21 | E22 | . . . |
| 3 | Name 3 | Transition | E31 | E32 | . . . |
| 4 | Name 4 | Transition | E41 | E42 | . . . |
| 5 | Name 5 | Special effect | E51 | E52 | . . . |
| 6 | Name 6 | Special effect | E61 | E62 | . . . |
| . . . | . . . | . . . | . . . | . . . | . . . |

TABLE 6

| Identification | Name | Type | Mt1 | Mt2 | . . . |
|---|---|---|---|---|---|
| 1 | Name 1 | Animation | F11 | F12 | . . . |
| 2 | Name 2 | Animation | F21 | F22 | . . . |
| 3 | Name 3 | Transition | F31 | F32 | . . . |
| 4 | Name 4 | Transition | F41 | F42 | . . . |
| 5 | Name 5 | Special effect | F51 | F52 | . . . |
| 6 | Name 6 | Special effect | F61 | F62 | . . . |
| . . . | . . . | . . . | . . . | . . . | . . . |

In Tables 4-6, D11-D62, E11-E62, and F11-F62 are the second initial scores.

For example, in response to the first music emotion comprising Me1, the first music style includes Mf1, Mf2, and the first music theme includes Mt1, for an intermediate effect identified as 4, according to the identification 4, a second initial score D41 corresponding to Me1 is acquired from the fourth preset list, a second initial score E41 corresponding to Mf1 and a second initial score E42 corresponding to Mf2 are acquired from the fifth preset list, and a second initial score F41 corresponding to Mt1 is acquired from the sixth preset list.

Alternatively, the screening the plurality of intermediate effects according to the second initial score to obtain the plurality of candidate effects, includes: for each intermediate effect, determining a sum of the second initial score corresponding to the first music emotion, the second initial score corresponding to the first music style and the second initial score corresponding to the first music theme, as a second target score corresponding to the intermediate effect; and determining intermediate effects of which the second target score is greater than or equal to a second threshold in the plurality of intermediate effects, as the plurality of candidate effects.

For example, for an intermediate effect identified as 4, a sum of D41, E41, E42, F41 is determined as the second target score.

Alternatively, the first threshold and the second threshold may be the same or different.

S302, determining one or more target effects in the plurality of candidate effects according to the first local feature.

Alternatively, the first local feature includes a second image emotion, a second image style and a second image scene corresponding to each of the plurality of images; and the determining one or more target effects in the plurality of candidate effects according to the first local feature, includes:

for each image, determining a third target score corresponding to each of the plurality of candidate effects under a condition of the each image, according to the plurality of candidate effects and the second image emotion, the second image style and the second image scene corresponding to the each image; and determining one or more target effects in the plurality of candidate effects according to the third target score corresponding to each of the plurality of candidate effects.

Alternatively, the third target score may be determined by:

for each image, under the condition of the each image:

for each candidate effect, according to the identification of the each candidate effect, acquiring the first initial score corresponding to the second image emotion of the each image from the first preset list, acquiring the first initial score corresponding to the second image style of the each image from the second preset list, and acquiring the first initial score corresponding to the second image scene of the each image from the third preset list; and determining a sum of the first initial score corresponding to the second image emotion, the first initial score corresponding to the second image style and the first initial score corresponding to the second image scene, as a third target score corresponding to the candidate effect under the condition of the each image.

A way to obtain the third target score will be described below by taking as an example that the plurality of images include image 1 and image 2, the second image emotion of the image 1 includes Tm1, the second image style thereof includes Tf1, the second image scene thereof includes Tt1; the second image emotion of the image 2 includes Tm2, the second image style thereof includes Tf1, and the second image scene thereof include Tt1 and Tt2.

Under the condition of the image 1:

For the candidate effect identified as 1, a first initial score A11 corresponding to Tm1 is acquired from the first preset list, a first initial score B11 corresponding to Tf1 is acquired from the second preset list, a first initial score C11 corresponding to Tt1 is acquired from the third preset list, and a sum of A11, B11 and C11 is determined as a third target score corresponding to the candidate effect identified as 1 under the condition of the image 1.

Under the condition of the image 2:

For the candidate effect identified as 1, a first initial score A12 corresponding to Tm2 is acquired from the first preset list, a first initial score B11 corresponding to Tf1 is acquired from the second preset list, a first initial score C11 corresponding to Tt1 and a first initial score C12 corresponding to Tt2 are acquired from the third preset list, respectively, and a sum of A12, B11, C11 and C12 is determined as a third target score corresponding to the candidate effect identified as 1 under the condition of the image 2.

Alternatively, the determining one or more target effects in the plurality of candidate effects may be made in 3 ways as follows.

Way 1, determining candidate effects of which the third target score is greater than or equal to a third threshold in the plurality of candidate effects, as the one or more target effects.

For example, in the plurality of candidate effects, a candidate effect of which the third target score corresponding to the plurality of candidate effects is greater than or equal to the third threshold under the condition of the image 1, and a candidate effect of which the third target score corresponding to the plurality of candidate effects is greater than or equal to the third threshold under the condition of the image 2, are determined as the one or more target effects.

Way 2, for each candidate effect, determining a sum of the third target score corresponding to the candidate effect under the condition of the image 1 and the third target score corresponding to the candidate effect under the condition of the image 2, as a total score corresponding to the candidate effect; and determining candidate effects of which the total score is greater than or equal to a fifth threshold in the plurality of candidate effects as the one or more target effects.

Way 3, in the plurality of candidate effects, determining candidate effects of which the third target score corresponding to the plurality of candidate effects is greater than or equal to the third threshold under the condition of the image 1, as a first target effect;

in the plurality of candidate effects, determining candidate effects of which the third target score corresponding to the plurality of candidate effects is greater than or equal to the third threshold under the condition of the image 2, as a second target effect;

determining the first target effect and the second target effect as the one or more target effects.

S303, performing combination processing on the one or more target effects to obtain one or more rendering combinations.

For example, in response to the one or more target effects includes 2 animations, 5 transitions, and 3 special effects, the 2 animations, 5 transitions, and 3 special effects are combined to obtain 30 (equal to a product of 2, 5, and 3) rendering combinations.

S304, determining a target rendering effect combination according to the first local feature, the second local feature and the one or more rendering combinations.

Specifically, the first local feature includes a second image emotion, a second image style and a second image scene corresponding to each of the plurality of images; the second local feature includes a chorus point, a phrase and section point and a beat point of a music fragment corresponding to each of the plurality of images in the music; S304 includes:

S3041, screening the one or more rendering combinations according to a second image emotion, a second image style and a second image scene corresponding to a first image in the plurality of images and a chorus point, a phrase and section point and a beat point of a music fragment corresponding to the first image, to obtain N initial candidate combinations.

N is an integer greater than or equal to 1.

Figure 4:
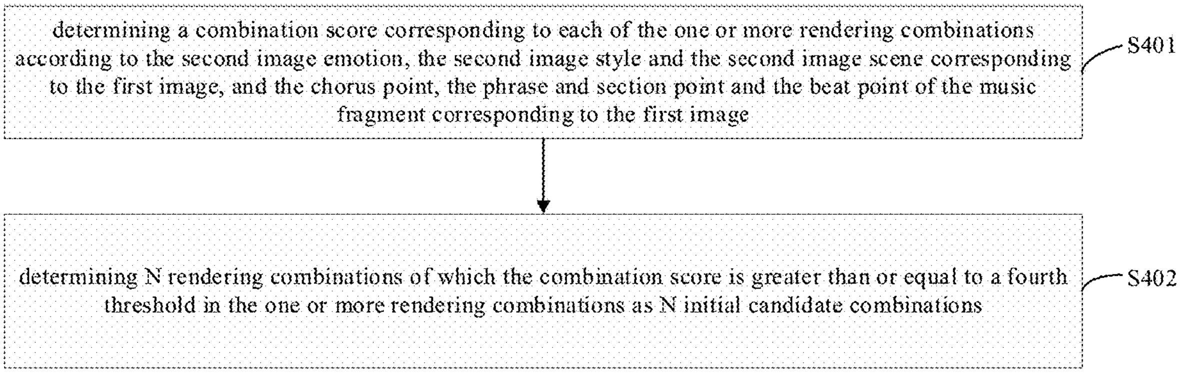
FIG. 4 is a flowchart of a method for determining N initial candidate combinations according to embodiments of the present disclosure.

Specifically, please refer to the embodiment in FIG. 4 for a detailed description of S3041.

S3042, determining M (j−1)th candidate combinations according to the N initial candidate combinations and the one or more rendering combinations, where M is equal to a product of N and a total number of the one or more rendering combinations; and screening the M (j−1)th candidate combinations according to a second image emotion, a second image style and a second image scene corresponding to a jth image, and a chorus point, a phrase and section point and a beat point of a music fragment corresponding to the jth image, to determine N jth candidate combinations, and taking the N jth candidate combinations as N new initial candidate combinations, adding 1 to j, and repeating the steps until a last image in the plurality of images, and determining a candidate combination corresponding to the last image as the target rendering effect combination.

j is an integer greater than or equal to 2. An initial value of j is 2.

Note that S3042 is repeated for other images than the first image in the plurality of images. Specifically, please refer to the embodiments in FIG. 5 for a detailed description of S3042.

In the embodiments of FIG. 3, according to the first global feature and the second global feature, a plurality of candidate effects are determined in the plurality of rendering effects, and then according to the first local feature, one or more target effects are determined in the plurality of candidate effects, so that the one or more target effects are rendering effects with a high matching degree with the plurality of images and the music. Moreover, by performing combination processing on the one or more target effects to obtain one or more rendering combinations, and determining the target rendering effect combination according to the first local feature, the second local feature and the one or more rendering combinations, the target rendering effect combination is the rendering effect combination most matched with the plurality of images and the music, and thus the richness of the generated video is improved.

In addition, in the embodiments of FIG. 3, after the one or more target effects are determined, the one or more target effects are combined to obtain one or more rendering combinations, and the target rendering effect combination is determined according to the first local feature, the second local feature, and the one or more rendering combinations, so that the amount of computation involved in the video generation process can be reduced, and thus the video generation efficiency is improved.

Next, the execution process of S3041 will be described below with reference to FIG. 4.

FIG. 4 is a flowchart of a method for determining N initial candidate combinations according to embodiments of the present disclosure. As shown in FIG. 4, the method includes:

S401, determining a combination score corresponding to each of the one or more rendering combinations according to the second image emotion, the second image style and the second image scene corresponding to the first image, and the chorus point, the phrase and section point and the beat point of the music fragment corresponding to the first image.

For each of the one or more rendering combinations: determining a music matching score according to the chorus point, the phrase and section point and the beat point of the music fragment corresponding to the first image and an identification of each rendering effect in the rendering combination;

determining an image matching score according to the second image emotion, the second image style and the second image scene corresponding to the first image and the identification of each rendering effect in the rendering combination;

determining an internal combination score corresponding to the first image; and determining the music matching score, the image matching score and the internal combination score as the combination score corresponding to the rendering combination.

Alternatively, the music matching score is determined by S4011 to S4013 as follows.

S4011, according to the identification of each rendering effect in the rendering combination, the third initial score corresponding to each of the chorus point, the phrase and section point and the beat point is acquired from a seventh preset list.

For example, the seventh preset list has a format as shown in Table 7 below.

TABLE 7

| Identification | Name | Type | chorus point | phrase and section point | beat point |
|---|---|---|---|---|---|
| 1 | Name 1 | Animation | G11 | G12 | G13 |
| 2 | Name 2 | Animation | G21 | G22 | G23 |
| 3 | Name 3 | Transition | G31 | G32 | G33 |
| 4 | Name 4 | Transition | G41 | G42 | G43 |
| 5 | Name 5 | Special effect | G51 | G52 | G53 |
| 6 | Name 6 | Special effect | G61 | G62 | G63 |
| . . . | . . . | . . . | . . . | . . . | . . . |

In Table 7, G11-G63 are the third initial scores.

For example, in response to the rendering combination comprising an animation identified as 2, a transition identified as 4, and a special effect identified as 6, a third initial score G21 of a chorus point, a third initial score G22 of a phrase and section point and a third initial score G23 of a beat point, corresponding to the animation identified as 2, are acquired from the seventh preset list;

a third initial score G41 of a chorus point, a third initial score G42 of a phrase and section point and a third initial score G43 of a beat point, corresponding to the transition identified as 4, are acquired from the seventh preset list; and a third initial score G61 of a chorus point, a third initial score G62 of a phrase and section point and a third initial score G63 of a beat point, corresponding to the special effect identified as 6, are acquired from the seventh preset list.

S4012, determining a global score of each rendering effect according to the identification of each rendering effect in the rendering combination.

For example, in response to the first music emotion comprising Me1, the first music style comprising Mf1, Mf2, and the first music theme comprising Mt, and in response to the rendering combination comprising the animation identified as 2, the transition identified as 4, and the special effect identified as 6, then the global score of the animation identified as 2 is equal to the second target score of the animation identified as 2 (equal to a sum of D21, E21, E22, F21);

the global score of the transition identified as 4 is equal to the second target score of the transition identified as 4 (equal to a sum of D41, E41, E42, F41); and the global score of the special effect identified as 6 is equal to the second target score of the special effect identified as 6 (equal to a sum of D61, E61, E62, F61). The method for calculating the second target score may refer to S301, which is not described herein again.

S4013, determining the third initial score corresponding to each of the chorus point, the phrase and section point and the beat point and a sum of the global score of each rendering effect, as the music matching score.

On the basis of the above S4011 to S4012, the music matching score is equal to a sum of G21, G22, G23, G41, G42, G43, G61, G62, G63, the global score of the animation identified as 2, the global score of the transition identified as 4, and the global score of the special effect identified as 6.

Alternatively, the image matching score may be determined by S4021 to S4022 as follows.

S4021, acquiring the first initial score corresponding to the second image emotion from the first preset list, acquiring the first initial score of the second image style from the second preset list, and acquiring the first initial score of the second image scene from the third preset list, according to the identification of each rendering effect in the rendering combination.

In response to the rendering combination comprising the animation identified as 2, the transition identified as 4, and the special effect identified as 6, and the second image emotion of the first image includes Tm1, the second image style thereof includes Tf1, the second image scene thereof includes Tt1, according to the identification 2, a first initial score A21 corresponding to Tm1 is acquired from the first preset list, a first initial score B21 corresponding to Tf1 is acquired from the second preset list, and a first initial score C11 corresponding to the image scene Tt1 is acquired from the third preset list;

according to the identification 4, a first initial score A41 corresponding to Tm1 is acquired from the first preset list, a first initial score B41 corresponding to Tf1 is acquired from the second preset list, and a first initial score C41 corresponding to the image scene Tt1 is acquired from the third preset list;

according to the identification 6, a first initial score A61 corresponding to Tm1 is acquired from the first preset list, a first initial score B61 corresponding to Tf1 is acquired from the second preset list, and a first initial score C71 corresponding to the image scene Tt1 is acquired from the third preset list.

S4022, determining an image matching score according to the plurality of first initial scores obtained in S4021.

Alternatively, on the basis of S4021, a sum of A21, B21, C11, A41, B41, C41, A61, B61, and C71 is determined as the image matching score.

Alternatively, the image matching score may also be determined according to the plurality of first initial scores obtained in S4021 in other manners, and details are not repeated here again.

Alternatively, by taking the attribute of the rendering effect including effect direction and visual impact as an example, a method for determining an internal combination score corresponding to the first image is described in the following S4031 to S4035.

S4031, determining, in an eighth preset list, a fourth initial score of an effect direction corresponding to each rendering effect, according to the identification of each rendering effect in the rendering combination.

For example, the eighth preset list has a format as shown in Table 8 below.

TABLE 8

| Identification | Name | Type | Effect direction | Visual impact | . . . |
|---|---|---|---|---|---|
| 1 | Name 1 | Animation | H11 | H12 | . . . |
| 2 | Name 2 | Animation | H21 | H22 | . . . |
| 3 | Name 3 | Transition | H31 | H32 | . . . |
| 4 | Name 4 | Transition | H41 | H42 | . . . |
| 5 | Name 5 | Special effect | H51 | H52 | . . . |
| 6 | Name 6 | Special effect | H61 | H62 | . . . |
| . . . | . . . | . . . | . . . | . . . | . . . |

In Table 8, H11-H63 are the fourth initial scores.

It should be noted that, in Tables 1 to 8, the identification is an identification of a rendering effect, the name is a name of the rendering effect, and the type is a type of the rendering effect.

For example, in response to the rendering combination comprising an animation identified as 2, a transition identified as 4, and a special effect identified as 6, according to the identification 2, a fourth initial score H21 of an effect direction corresponding to the animation identified as 2 is acquired from the eighth preset list; according to the identification 4, a fourth initial score H41 of an effect direction corresponding to the transition identified as 4 is acquired from the eighth preset list; according to the identification 6, a fourth initial score H61 of an effect direction corresponding to the special effect identified as 6 is acquired from the eighth preset list.

S4032, determining an effect direction attribute score according to the fourth initial score of the effect direction corresponding to each rendering effect.

Alternatively, determining a similarity corresponding to each two rendering effects according to a fourth initial score of the effect direction corresponding to each of the each two rendering effects; and determining a sum of the similarity corresponding to each two rendering effects as the effect direction attribute score. Alternatively, the similarity may be cosine similarity or other similarities.

For example, in response to the rendering combination comprising the animation identified as 2, the transition identified as 4, and the special effect identified as 6, the similarity corresponding to the animation identified as 2 and the transition identified as 4 is determined, according to the fourth initial score H21 of the effect direction corresponding to the animation identified as 2 and the fourth initial score H41 of the effect direction corresponding to the transition identified as 4;

the similarity corresponding to the transition identified as 4 and the special effect identified as 6 is determined, according to the fourth initial score H41 of the effect direction corresponding to the transition identified as 4 and the fourth initial score H61 of the effect direction corresponding to the special effect identified as 6;

the similarity corresponding to the animation identified as 2 and the special effect identified as 6 is determined according to the fourth initial score H21 of the effect direction corresponding to the animation identified as 2 and the fourth initial score H61 of the effect direction corresponding to the special effect identified as 6; and a sum of the similarity corresponding to the animation identified as 2 and the transition identified as 4, the similarity corresponding to the transition identified as 4 and the special effect identified as 6, and the similarity corresponding to the animation identified as 2 and the transition identified as 6, is determined as the effect direction attribute score.

S4033, according to the identification of each rendering effect in the rendering combination, determining a fourth initial score of a visual impact corresponding to each rendering effect in the eighth preset list.

In response to the rendering combination comprising the animation identified as 2, the transition identified as 4 and the special effect identified as 6, according to the identification 2, a fourth initial score H22 of the visual impact corresponding to the animation identified as 2 is acquired from the eighth preset list;

according to the identification 4, a fourth initial score H42 of the visual impact corresponding to the transition identified as 4 is acquired from the eighth preset list;

according to the identification 6, a fourth initial score H62 of the visual impact corresponding to the special effect identified as 6 is acquired from the eighth preset list.

S4034, determining a visual impact attribute score according to the fourth initial score of the visual impact corresponding to each rendering effect.

Alternatively, an impact difference score corresponding to each two rendering effects is determined according to a fourth initial score of the visual impact corresponding to each one of each two rendering effects; and a sum of the impact difference score corresponding to each two rendering effects is determined as the visual impact attribute score.

Alternatively, the impact difference score corresponding to two rendering effects may be represented by the following formula: $-\beta*|X1-X2|$; where β is a preset value, − is a negative sign, * is a multiplication sign, X1 is a fourth initial score of the visual impact corresponding to one of the two rendering effects, X2 is a fourth initial score of the visual impact corresponding to the other of the two rendering effects, || is an absolute value.

For example, in response to the fourth initial score of the visual impact corresponding to the animation identified as 2 being H22, the fourth initial score of visual impact corresponding to the transition identified as 4 being H42, and the fourth initial score of the visual impact corresponding to the special effect identified as 6 being H62, the visual impact attribute score is equal to a sum of $(-\beta*|H22-H42|)$, $(-B*|H42-H62|)$ and $(-\beta*|H22-H62|)$.

S4035, determining a sum of the effect direction attribute score and the visual impact attribute score as an internal combination score corresponding to the first image.

S402, determining N rendering combinations of which the combination score is greater than or equal to a fourth threshold in the one or more rendering combinations as N initial candidate combinations.

Specifically, Nis a preset value. For example, N may be 10, 20, etc., and N is not limited herein.

In the embodiment in FIG. 4, according to the second image emotion, the second image style, and the second image scene corresponding to the first image, and the chorus point, the phrase and section point, and the beat point of the music fragment corresponding to the first image, a combination score corresponding to each of the one or more rendering combinations is determined, N rendering combinations of which the combination score is greater than or equal to the fourth threshold in the one or more rendering combinations are determined as N initial candidate combinations, so that the determined N initial candidate combinations are N initial candidate combinations most matched with the local feature of the first image and the local feature of the music fragment corresponding to the first image, and thus a matching degree of the target rendering effect combination with the plurality of images and the music is improved.

On the basis of the above embodiments, a loop process involved in determining the target rendering effect combination is described below with reference to FIG. 5.

Figure 5:
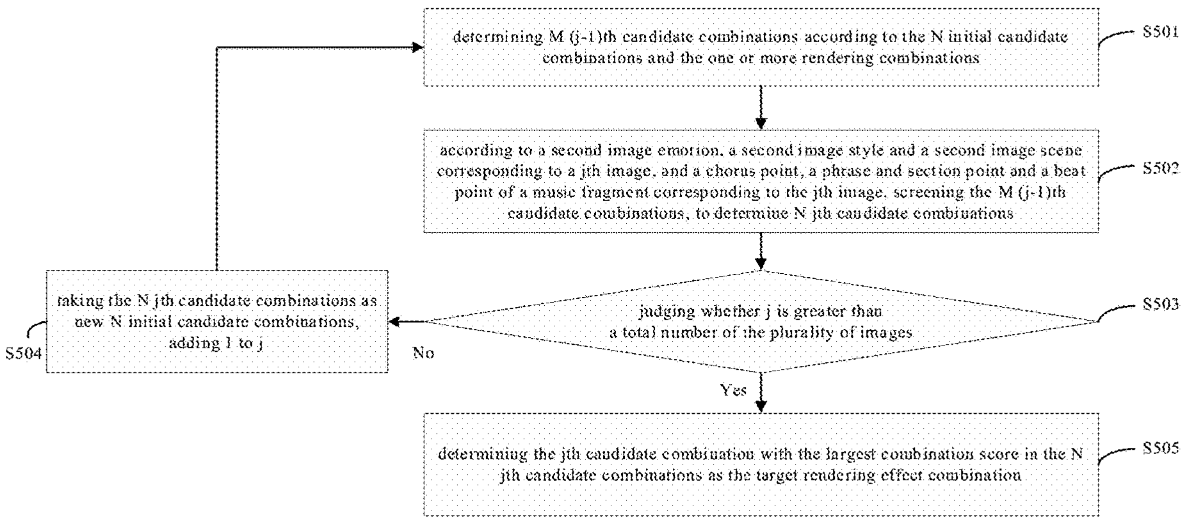
FIG. 5 is a flowchart of a loop method for determining a target rendering effect combination according to embodiments of the present disclosure.

FIG. 5 is a flowchart of a loop method for determining a target rendering effect combination according to embodiments of the present disclosure. As shown in FIG. 5, the method includes:

S501, determining M (j−1)th candidate combinations according to the N initial candidate combinations and the one or more rendering combinations.

M is equal to a product of N and a total number of the one or more rendering combinations.

S502, according to a second image emotion, a second image style and a second image scene corresponding to a jth image, and a chorus point, a phrase and section point and a beat point of a music fragment corresponding to the jth image, screening the M (j−1)th candidate combinations, to determine N jth candidate combinations.

The initial value of j is 2.

S503, judging whether j is greater than a total number of the plurality of images.

If not, executing S504, otherwise executing S505.

S504, taking the Njth candidate combinations as new N initial candidate combinations, adding 1 to j, and repeating S501-S503.

S505, determining the jth candidate combination with the largest combination score in the N jth candidate combinations as the target rendering effect combination.

It should be noted that, in response to S505 being executed, it indicates that the jth image is the last image, and at this time, the jth candidate combination with the largest combination score in the N jth candidate combinations is the candidate combination corresponding to the last image.

For each jth candidate combination, the combination score corresponding to the jth candidate combination is equal to a sum of the music matching score, the image matching score, the internal combination score and the combination matching score.

The method for determining the music matching score is similar to the execution process of the above S4011 to S4013, and is not described herein again.

The method for determining the image matching score is similar to the execution process of the above S4021 to S4022, and is not described herein again.

The method of determining the internal combination score is similar to the execution process of the above S4031-S4035, and is not described herein again.

The determining of the combination matching score is explained below by taking an example that the plurality of images include a first image and a second image, the jth candidate combination includes animation, transition and special effect of the first image, and animation, transition and special effects of the second image:

- determining the effect direction and the video impact of each rendering effect in the eighth preset list, according to the identification of each rendering effect in the jth candidate combination;
- determining a first similarity according to a fourth initial score of the effect direction corresponding to the animation of the first image and a fourth initial score of the effect direction corresponding to the animation of the second image;
- determining a second similarity according to a fourth initial score of the effect direction corresponding to the transition of the first image and a fourth initial score of the effect direction corresponding to the transition of the second image;
- determining a third similarity according to a fourth initial score of the effect direction corresponding to the special effect of the first image and a fourth initial score of the effect direction corresponding to the special effect of the second image;
- determining a first impact difference score according to a fourth initial score of the video impact corresponding to the animation of the first image and a fourth initial score of the video impact corresponding to the animation of the second image;
- determining a second impact difference score according to a fourth initial score of the video impact corresponding to the transition of the first image and a fourth initial score of the video impact corresponding to the transition of the second image;
- determining a third impact difference score according to a fourth initial score of the video impact corresponding to the special effect of the first image and a fourth initial score of the video impact corresponding to the special effect of the second image; and
- determining a sum of the first similarity, the second similarity, the third similarity, the first impact difference score, the second impact difference score and the third impact difference score as a combination matching score.

The determination method of the first similarity, the second similarity, and the third similarity is similar to the determination method of the similarity corresponding to each two identifications in S4032, and is not described herein again.

The determination method of the first impact difference score, the second impact difference score and the third impact difference score is similar to the determination method of the impact difference score corresponding to each two identifications in S4034, and is not described herein again.

Figure 6:
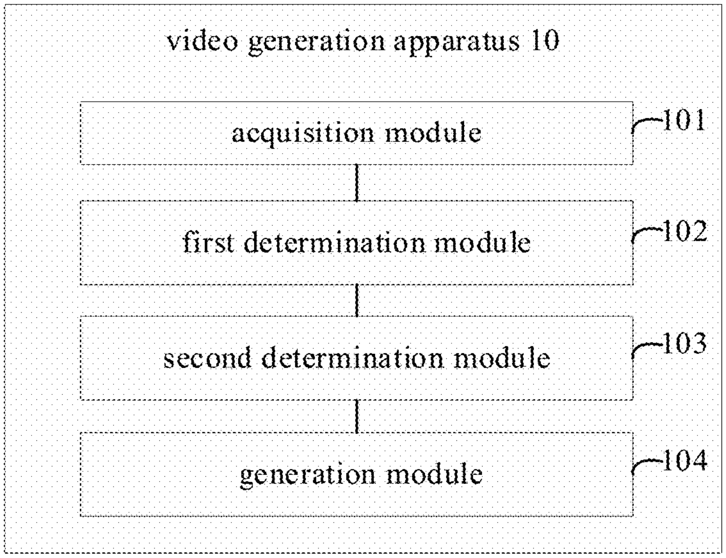
FIG. 6 is a structural diagram of a video generation apparatus according to embodiments of the present disclosure.

FIG. 6 is a structural diagram of a video generation apparatus according to embodiments of the present disclosure. As shown in FIG. 6, the video generation apparatus 10 includes:

- an acquisition module 101 configured to acquire a plurality of images and music matched with the plurality of images;
- a first determination module 102 configured to determine first feature information of the plurality of images and second feature information of the music;
- a second determination module 103 configured to determine a target rendering effect combination according to the first feature information, the second feature information and a pre-stored plurality of rendering effects; the rendering effects being animation, special effect or transition; and
- a generation module 104 configured to generate a video according to the plurality of images, the music and the target rendering effect combination.

The video generation apparatus provided in the embodiments of the present disclosure may implement the above video generation method, and their implementation principles and beneficial effects are similar, which are not described herein again.

Alternatively, the first feature information comprises a first global feature and a first local feature; the second feature information comprises a second global feature and a second local feature; the second determination module 103 is specifically configured to: determine a plurality of candidate effects in the plurality of rendering effects according to the first global feature and the second global feature; determine one or more target effects in the plurality of candidate effects according to the first local feature, and perform combination processing on the one or more target effects to obtain one or more rendering combinations; and determine the target rendering effect combination according to the first local feature, the second local feature and the one or more rendering combinations.

Alternatively, the first global feature comprises a first image emotion, a first image style and a first image scene corresponding to the plurality of images, and the second global feature comprises a first music emotion, a first music style and a first music theme; the second determination module 103 is specifically configured to: for each rendering effect, acquire a first initial score corresponding to each of the first image emotion, the first image style and the first image scene according to an identification of the rendering effect; screen the plurality of rendering effects according to the first initial score to obtain a plurality of intermediate effects; for each intermediate effect, acquire a second initial score corresponding to each of the first music emotion, the first music style and the first music theme according to an identification of the intermediate effect; and screen the plurality of intermediate effects according to the second initial score to obtain the plurality of candidate effects.

Alternatively, the second determination module 103 is specifically configured to: for each rendering effect, determine a sum of the first initial score corresponding to the first image emotion, the first initial score corresponding to the first image style and the first initial score corresponding to the first image scene, as a first target score corresponding to the rendering effect; and determine rendering effects of which the first target score is greater than or equal to a first threshold in the plurality of rendering effects, as the plurality of intermediate effects.

Alternatively, the second determination module 103 is specifically configured to: for each intermediate effect, determine a sum of the second initial score corresponding to each of the first music emotion, the first music style and the first music theme, as a second target score corresponding to the intermediate effect; and determine intermediate effects of which the second target score is greater than or equal to a second threshold in the plurality of intermediate effects, as the plurality of candidate effects.

Alternatively, the first local feature comprises a second image emotion, a second image style and a second image scene corresponding to each of the plurality of images; the second determination module 103 is specifically configured to: for each image, determine a third target score corresponding to each of the plurality of candidate effects under a condition of the each image, according to the plurality of candidate effects and the second image emotion, the second image style and the second image scene corresponding to the each image; and determine the one or more target effects in the plurality of candidate effects according to the third target score corresponding to each of the plurality of candidate effects.

Alternatively, the first local feature comprises a second image emotion, a second image style and a second image scene corresponding to each of the plurality of images; the second local feature comprises a chorus point, a phrase and section point and a beat point of a music fragment corresponding to each of the plurality of images in the music; the second determination module 103 is specifically configured to: screen the one or more rendering combinations according to a second image emotion, a second image style and a second image scene corresponding to a first image in the plurality of images, and a chorus point, a phrase and section point and a beat point of a music fragment corresponding to the first image, to obtain N initial candidate combinations, where N is an integer greater than or equal to 1; determine M (j−1)th candidate combinations according to the N initial candidate combinations and the one or more rendering combinations, where M is equal to a product of N and a total number of the one or more rendering combinations; screen the M (j−1)th candidate combinations according to a second image emotion, a second image style and a second image scene corresponding to a jth image, and a chorus point, a phrase and section point and a beat point of a music fragment corresponding to the jth image, to determine N jth candidate combinations, and take the N jth candidate combinations as new N initial candidate combinations, add 1 to j, and repeat the steps until a last image in the plurality of images, and determine a candidate combination corresponding to the last image as the target rendering effect combination; where an initial value of j is 2.

Alternatively, the second determination module 103 is specifically configured to: determine a combination score corresponding to each of the one or more rendering combinations according to the second image emotion, the second image style and the second image scene corresponding to the first image, and the chorus point, the phrase and section point and the beat point of the music fragment corresponding to the first image; and determine N rendering combinations of which the combination score is greater than or equal to a fourth threshold in the one or more rendering combinations, as the N initial candidate combinations.

Alternatively, the second determination module 103 is specifically configured to: for each rendering combination in the one or more rendering combinations, determine a music matching score according to the chorus point, the phrase and section point and the beat point of the music fragment corresponding to the first image and an identification of each rendering effect in the rendering combination; determine an image matching score according to the second image emotion, the second image style and the second image scene corresponding to the first image and the identification of each rendering effect in the rendering combination; determine an internal combination score corresponding to the first image; and determine the music matching score, the image matching score and the internal combination score as the combination score corresponding to the rendering combination.

Alternatively, the first determination module 102 is specifically configured to: perform feature extraction on the plurality of images through a pre-stored image feature extraction model, to obtain the first feature information of the plurality of images; and perform feature extraction on the music through a pre-stored music feature extraction model, to obtain the second feature information.

Alternatively, the generation module 104 is specifically configured to: sequentially display the plurality of images according to the animation, special effect and transition corresponding to each of the plurality of images in the target rendering effect combination, and play the music, to generate the video.

Alternatively, the acquisition module 101 is specifically configured to: in response to a selection operation of a plurality of target images in a plurality of candidate images, determine the plurality of target images as the plurality of images; and in response to a selection operation of target music in a plurality of candidate music, determine the target music as the music matched with the plurality of images.

The video generation apparatus provided in the embodiment of the present disclosure may implement the above video generation method, and their implementation principles and beneficial effects are similar, which are not described herein again.

Figure 7:
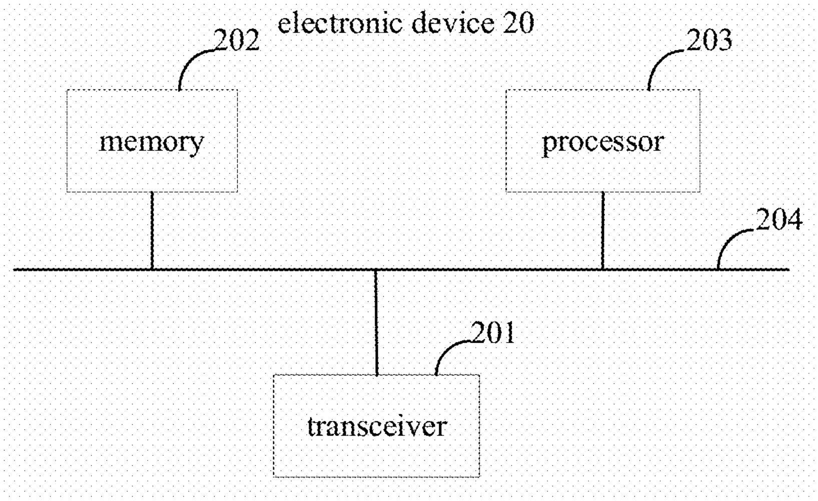
FIG. 7 is a hardware schematic diagram of an electronic device according to embodiments of the present disclosure.

FIG. 7 is a hardware schematic diagram of an electronic device according to embodiments of the present disclosure. As shown in FIG. 7, the electronic device 20 may include: a transceiver 201, a memory 202, a processor 203. The transceiver 201 may include: a transmitter and/or a receiver. The transmitter may also be referred to as a sender, an emitter, a sending port, a sending interface, and the like, and the receiver may also be referred to as a receiving device, a receiving port, a receiving interface, and the like. The transceiver 201, memory 202, and processor 203 are illustratively interconnected via a bus 204.

The memory 202 is configured to store computer-executable instructions;

The processor 203 is configured to execute the computer-executable instructions stored in the memory 202, to cause the processor 203 to perform the video generation method described above.

An embodiment of the present disclosure provides a non-transitory computer-readable storage medium, having computer-executable instructions stored thereon, which, in response to being executed by a processor, implement the video generation method described above.

An embodiment of the present disclosure further provides a computer program product, comprising a computer program, which, in response to being executed by a processor, implements the video generation method described above.

An embodiment of the present disclosure further provides a computer program, which, in response to being executed by a processor, implements the video generation method described above.

All or part of the steps of the above-described method embodiments may be performed by hardware associated with program instructions. The foregoing program may be stored in a readable memory. In response to being executed, the program performs the steps of the method embodiments described above; and the memory (storage medium) includes: read-only memory (ROM), random access memory (RAM), flash memory, hard disk, solid state disk, magnetic tape, floppy disk, optical disc, and any combination thereof.

The embodiments of the present disclosure are described with reference to flowcharts and/or block diagrams of methods, apparatus (systems), and computer program products according to the embodiments of the present disclosure. It will be understood that each flow and/or block of the flowchart and/or block diagram, and combinations of flows and/or blocks in the flowchart and/or block diagram, can be implemented by computer program instructions. These computer program instructions may be provided to a processing unit of a general purpose computer, special purpose computer, embedded processor, or other programmable data processing devices to produce a machine, such that the instructions, executed via the processing unit of the computer or other programmable data processing devices, create means for implementing the functions specified in one flow or one or more flows in the flowchart and/or one block or one or more blocks in the block diagram.

These computer program instructions may also be stored in a computer-readable memory that can direct a computer or other programmable data processing devices to function in a particular manner, such that the instructions stored in the computer-readable memory produce an article of manufacture including instruction means which implement the functions specified in one flow or one or more flows in the flowchart and/or one block or one or more blocks in the block diagram.

These computer program instructions may also be loaded onto a computer or other programmable data processing devices, to cause a series of operational steps to be performed on the computer or other programmable devices to produce a computer implemented process, such that the instructions executed on the computer or other programmable devices provide steps for implementing the functions specified in one flow or one or more flows in the flowchart and/or one block or one or more blocks in the block diagram.

It will be apparent to those skilled in the art that various variations and modifications may be made to the embodiments of the present disclosure without departing from the spirit and scope of the present disclosure. Thus, if such modifications and variations to the embodiments of the present disclosure fall within the scope of the claims of the present disclosure and their equivalents, the present disclosure is also intended to encompass these modifications and variations.

In the present disclosure, the term "include" and variations thereof may refer to non-limiting inclusions; the term "or" and variations thereof may mean "and/or". The terms "first," "second," and the like in the present disclosure are used for distinguishing between similar elements and not necessarily for describing a particular sequential or chronological order. In the present disclosure, "at least two" means two or more. "and/or" describes association of associated objects, indicating that there may be three relationships, for example, A and/or B, which may indicate that: A exists alone, A and B exist simultaneously, and B exists alone. The character "/" generally indicates that the former and latter associated objects are in an "or" relationship.

Other embodiments of the present disclosure will be apparent to those skilled in the art from consideration of the specification and practice of the disclosure disclosed herein. The present disclosure is intended to cover any variation, use, or adaptation of the present disclosure, which follow the general principles of the present disclosure, and include common knowledge or customary technical means in the technical field not disclosed in the present disclosure. It is intended that the specification and the embodiments be considered as exemplary only, with a true scope and spirit of the present disclosure being indicated by the following claims.

It will be understood that the present disclosure is not limited to the precise arrangements that have been described above and shown in the drawings, and that various modifications and changes can be made without departing from the scope thereof. The scope of the present disclosure is limited only by the appended claims.

What is claimed is:

1. A method of generating videos, comprising:

acquiring a plurality of images and music matched with the plurality of images;

determining first feature information of the plurality of images and second feature information of the music, wherein the first feature information comprises a first global feature and a first local feature, and the second feature information comprises a second global feature and a second local feature;

determining a rendering effect combination according to the first feature information, the second feature information and a pre-stored plurality of rendering effects, wherein the rendering effects are animation, special effect or transition, and the determining the rendering effect combination comprises:

determining a plurality of candidate effects in the plurality of rendering effects according to the first global feature and the second global feature, determining one or more effects in the plurality of candidate effects according to the first local feature, and performing combination processing on the one or more effects to obtain one or more rendering combinations, and determining the rendering effect combination according to the first local feature, the second local feature and the one or more rendering combinations; and generating a video according to the plurality of images, the music and the rendering effect combination.

2. The method according to claim 1, wherein:

the first global feature comprises a first image emotion, a first image style and a first image scene corresponding to the plurality of images;

the second global feature comprises a first music emotion, a first music style and a first music theme; and the determining a plurality of candidate effects in the plurality of rendering effects according to the first global feature and the second global feature, comprises:

for each rendering effect, acquiring a first initial score corresponding to each of the first image emotion, the first image style and the first image scene according to an identification of the each rendering effect;

screening the plurality of rendering effects according to the first initial score to obtain a plurality of intermediate effects;

for each intermediate effect, acquiring a second initial score corresponding to each of the first music emotion, the first music style and the first music theme according to an identification of the each intermediate effect; and screening the plurality of intermediate effects according to the second initial score to obtain the plurality of candidate effects.

3. The method according to claim 2, wherein the screening the plurality of rendering effects according to the first initial score to obtain a plurality of intermediate effect, comprises:

for each rendering effect, determining a sum of the first initial score corresponding to each of the first image emotion, the first image style and the first image scene, as a first score corresponding to the each rendering effect; and determining rendering effects of which the first score is greater than or equal to a first threshold in the plurality of rendering effects, as the plurality of intermediate effects.

4. The method according to claim 2, wherein the screening the plurality of intermediate effects according to the second initial score to obtain the plurality of candidate effects, comprises:

for each intermediate effect, determining a sum of the second initial score corresponding to each of the first music emotion, the first music style and the first music theme, as a second score corresponding to the each intermediate effect; and determining intermediate effects of which the second score is greater than or equal to a second threshold in the plurality of intermediate effects, as the plurality of candidate effects.

5. The method according to claim 1, wherein:

the first local feature comprises a second image emotion, a second image style and a second image scene corresponding to each of the plurality of images; and the determining the one or more effects in the plurality of candidate effects according to the first local feature, comprises:

for each image, determining a third score corresponding to each of the plurality of candidate effects under a condition of the each image, according to the plurality of candidate effects and the second image emotion, the second image style and the second image scene corresponding to the each image; and determining the one or more effects in the plurality of candidate effects according to the third score corresponding to each of the plurality of candidate effects.

6. The method according to claim 1, wherein:

the first local feature comprises a second image emotion, a second image style and a second image scene corresponding to each of the plurality of images;

the second local feature comprises a chorus point, a phrase and section point and a beat point of a music fragment corresponding to each of the plurality of images in the music; and the determining the rendering effect combination according to the first local feature, the second local feature and the one or more rendering combinations, comprises:

screening the one or more rendering combinations according to a second image emotion, a second image style and a second image scene corresponding to a first image in the plurality of images, and a chorus point, a phrase and section point and a beat point of a music fragment corresponding to the first image, to obtain N initial candidate combinations, where N is an integer greater than or equal to 1;

determining M (j−1)th candidate combinations according to the N initial candidate combinations and the one or more rendering combinations, where M is equal to a product of N and a total number of the one or more rendering combinations;

screening the M (j−1)th candidate combinations according to a second image emotion, a second image style and a second image scene corresponding to a jth image, and a chorus point, a phrase and section point and a beat point of a music fragment corresponding to the jth image, to determine N jth candidate combinations, and taking the N jth candidate combinations as new N initial candidate combinations, adding 1 to j, and repeating the steps until a last image in the plurality of images, where an initial value of j is 2; and determining a candidate combination corresponding to the last image as the rendering effect combination.

7. The method according to claim 6, wherein the screening the one or more rendering combinations according to a second image emotion, a second image style and a second image scene corresponding to a first image in the plurality of images, and a chorus point, a phrase and section point and a beat point of a music fragment corresponding to the first image, to obtain N initial candidate combinations, comprises:

determining a combination score corresponding to each of the one or more rendering combinations, according to the second image emotion, the second image style and the second image scene corresponding to the first image, and the chorus point, the phrase and section point and the beat point of the music fragment corresponding to the first image; and determining N rendering combinations of which the combination score is greater than or equal to a fourth threshold in the one or more rendering combinations, as the N initial candidate combinations.

8. The method according to claim 7, wherein the determining a combination score corresponding to each of the one or more rendering combinations, according to the second image emotion, the second image style and the second image scene corresponding to the first image, and the chorus point, the phrase and section point and the beat point of the music fragment corresponding to the first image, comprises:

for each rendering combination in the one or more rendering combinations, determining a music matching score according to the chorus point, the phrase and section point and the beat point of the music fragment corresponding to the first image and an identification of each rendering effect in the each rendering combination;

determining an image matching score according to the second image emotion, the second image style and the second image scene corresponding to the first image and the identification of each rendering effect in the each rendering combination;

determining an internal combination score corresponding to the first image; and determining the music matching score, the image matching score and the internal combination score as the combination score corresponding to the each rendering combination.

9. The method according to claim 1, wherein the determining first feature information of the plurality of images and second feature information of the music, comprises:

performing feature extraction on the plurality of images through a pre-stored image feature extraction model, to obtain the first feature information of the plurality of images; and performing feature extraction on the music through a pre-stored music feature extraction model, to obtain the second feature information.

10. The method according to claim 1, wherein:

the rendering effect combination comprises the animation, special effect and transition corresponding to each of the plurality of images;

the generating a video according to the plurality of images, the music and the rendering effect combination, comprises:

sequentially displaying the plurality of images according to the animation, special effect and transition corresponding to each of the plurality of images in the rendering effect combination, and playing the music, to generate the video.

11. The method according to claim 1, wherein the acquiring a plurality of images and music matched with the plurality of images, comprises:

in response to a selection operation on a plurality of images in a plurality of candidate images, determining the plurality of images as the plurality of images; and in response to a selection operation on music in a plurality of candidate music, determining the music as the music matched with the plurality of images.

12. An electronic device, comprising: a processor, and a memory communicatively connected to the processor; the memory storing computer-executable instructions; the processor executing the computer-executable instructions stored in the memory to implement operations comprising:

acquiring a plurality of images and music matched with the plurality of images;

determining first feature information of the plurality of images and second feature information of the music, wherein the first feature information comprises a first global feature and a first local feature, and the second feature information comprises a second global feature and a second local feature;

determining a rendering effect combination according to the first feature information, the second feature information and a pre-stored plurality of rendering effects, wherein the pre-stored plurality of rendering effects comprise animations, special effects or transitions, and the determining the rendering effect combination comprises:

determining a plurality of candidate effects in the plurality of rendering effects according to the first global feature and the second global feature, determining one or more effects in the plurality of candidate effects according to the first local feature, and performing combination processing on the one or more effects to obtain one or more rendering combinations, and determining the rendering effect combination according to the first local feature, the second local feature and the one or more rendering combinations; and generating a video according to the plurality of images, the music and the rendering effect combination.

13. The electronic device according to claim 12, wherein the first global feature comprises a first image emotion, a first image style and a first image scene corresponding to the plurality of images; the second global feature comprises a first music emotion, a first music style and a first music theme; and the determining the plurality of candidate effects in the plurality of rendering effects according to the first global feature and the second global feature, comprises:

for each rendering effect, acquiring a first initial score corresponding to each of the first image emotion, the first image style and the first image scene according to an identification of the each rendering effect;

screening the plurality of rendering effects according to the first initial score to obtain a plurality of intermediate effects;

for each intermediate effect, acquiring a second initial score corresponding to each of the first music emotion, the first music style and the first music theme according to an identification of the each intermediate effect; and screening the plurality of intermediate effects according to the second initial score to obtain the plurality of candidate effects.

14. The electronic device according to claim 12, wherein the first local feature comprises a second image emotion, a second image style and a second image scene corresponding to each of the plurality of images; and the determining the one or more effects in the plurality of candidate effects according to the first local feature, comprises:

for each image, determining a third score corresponding to each of the plurality of candidate effects under a condition of the each image, according to the plurality of candidate effects and the second image emotion, the second image style and the second image scene corresponding to the each image; and determining the one or more effects in the plurality of candidate effects according to the third score corresponding to each of the plurality of candidate effects.

15. The electronic device according to claim 12, wherein the first local feature comprises a second image emotion, a second image style and a second image scene corresponding to each of the plurality of images;

the second local feature comprises a chorus point, a phrase and section point and a beat point of a music fragment corresponding to each of the plurality of images in the music; and the determining the rendering effect combination according to the first local feature, the second local feature and the one or more rendering combinations, comprises:

screening the one or more rendering combinations according to a second image emotion, a second image style and a second image scene corresponding to a first image in the plurality of images, and a chorus point, a phrase and section point and a beat point of a music fragment corresponding to the first image, to obtain N initial candidate combinations, where N is an integer greater than or equal to 1;

determining M (j−1)th candidate combinations according to the N initial candidate combinations and the one or more rendering combinations, where M is equal to a product of N and a total number of the one or more rendering combinations;

screening the M (j−1)th candidate combinations according to a second image emotion, a second image style and a second image scene corresponding to a jth image, and a chorus point, a phrase and section point and a beat point of a music fragment corresponding to the jth image, to determine N jth candidate combinations, and taking the N jth candidate combinations as new N initial candidate combinations, adding 1 to j, and repeating the steps until a last image in the plurality of images, where an initial value of j is 2; and determining a candidate combination corresponding to the last image as the rendering effect combination.

16. The electronic device according to claim 12, wherein the determining the first feature information of the plurality of images and the second feature information of the music, comprises:

performing feature extraction on the plurality of images through a pre-stored image feature extraction model, to obtain the first feature information of the plurality of images; and performing feature extraction on the music through a pre-stored music feature extraction model, to obtain the second feature information.

17. A non-transitory computer-readable storage medium, having computer-executable instructions stored thereon, which, in response to being executed by a processor, implement the operations, the operations comprising:

acquiring a plurality of images and music matched with the plurality of images;

determining first feature information of the plurality of images and second feature information of the music, wherein the first feature information comprises a first global feature and a first local feature, and the second feature information comprises a second global feature and a second local feature;

determining a rendering effect combination according to the first feature information, the second feature information and a pre-stored plurality of rendering effects, wherein the rendering effects are animation, special effect or transition, and the determining the rendering effect combination comprises:

determining a plurality of candidate effects in the plurality of rendering effects according to the first global feature and the second global feature, determining one or more effects in the plurality of candidate effects according to the first local feature, and performing combination processing on the one or more effects to obtain one or more rendering combinations, and determining the rendering effect combination according to the first local feature, the second local feature and the one or more rendering combinations; and generating a video according to the plurality of images, the music and the rendering effect combination.

18. The non-transitory computer-readable storage medium according to claim 17, wherein:

the first global feature comprises a first image emotion, a first image style and a first image scene corresponding to the plurality of images;

the second global feature comprises a first music emotion, a first music style and a first music theme; and the determining a plurality of candidate effects in the plurality of rendering effects according to the first global feature and the second global feature, comprises:

for each rendering effect, acquiring a first initial score corresponding to each of the first image emotion, the first image style and the first image scene according to an identification of the each rendering effect;

screening the plurality of rendering effects according to the first initial score to obtain a plurality of intermediate effects;

for each intermediate effect, acquiring a second initial score corresponding to each of the first music emotion, the first music style and the first music theme according to an identification of the each intermediate effect; and screening the plurality of intermediate effects according to the second initial score to obtain the plurality of candidate effects.

19. The non-transitory computer-readable storage medium according to claim 18, wherein the screening the plurality of rendering effects according to the first initial score to obtain a plurality of intermediate effect, comprises:

for each rendering effect, determining a sum of the first initial score corresponding to each of the first image emotion, the first image style and the first image scene, as a first score corresponding to the each rendering effect; and determining rendering effects of which the first score is greater than or equal to a first threshold in the plurality of rendering effects, as the plurality of intermediate effects.

20. The non-transitory computer-readable storage medium according to claim 18, wherein the screening the plurality of intermediate effects according to the second initial score to obtain the plurality of candidate effects, comprises:

for each intermediate effect, determining a sum of the second initial score corresponding to each of the first music emotion, the first music style and the first music theme, as a second score corresponding to the each intermediate effect; and determining intermediate effects of which the second score is greater than or equal to a second threshold in the plurality of intermediate effects, as the plurality of candidate effects.

* * * * *